United States Patent
Bogestam et al.

(10) Patent No.: US 8,406,691 B2
(45) Date of Patent: Mar. 26, 2013

(54) METHOD AND SYSTEM FOR PROVIDING WIRELESS COMMUNICATION BETWEEN USER EQUIPMENTS

(75) Inventors: Kent Bogestam, Hägersten (SE); Ayodele Damola, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 121 days.

(21) Appl. No.: 13/133,512

(22) PCT Filed: Dec. 17, 2008

(86) PCT No.: PCT/SE2008/051480
§ 371 (c)(1),
(2), (4) Date: Jun. 8, 2011

(87) PCT Pub. No.: WO2010/071510
PCT Pub. Date: Jun. 24, 2010

(65) Prior Publication Data
US 2011/0244800 A1    Oct. 6, 2011

(51) Int. Cl.
*H04B 7/00* (2006.01)

(52) U.S. Cl. .......... 455/41.2; 455/550.1; 455/435.2; 455/456.1; 455/414.1; 455/556.2; 455/557; 709/206; 370/338; 370/449; 370/216; 704/200; 715/234; 715/716

(58) Field of Classification Search ............. 455/41.2, 455/414.1, 550.1, 435.2, 456.1, 556.2, 557
See application file for complete search history.

(56) References Cited

U.S. PATENT DOCUMENTS

| | | | |
|---|---|---|---|
| 7,502,615 B2 * | 3/2009 | Wilhoite et al. | 455/442 |
| 7,809,381 B2 * | 10/2010 | Aborn et al. | 455/456.5 |
| 8,099,112 B2 * | 1/2012 | Krishnamurthi et al. | 455/456.6 |
| 8,144,725 B2 * | 3/2012 | Bienas et al. | 370/449 |
| 8,184,656 B2 * | 5/2012 | Chandra et al. | 370/445 |
| 2005/0181763 A1 | 8/2005 | Enderlein | |
| 2005/0188010 A1 * | 8/2005 | Valk | 709/203 |
| 2006/0025169 A1 | 2/2006 | Maciocco et al. | |

(Continued)

FOREIGN PATENT DOCUMENTS

| EP | 1 942 455 A1 | 7/2008 |
|---|---|---|
| WO | WO 03/090143 A2 | 10/2003 |

(Continued)

OTHER PUBLICATIONS

International Search Report, PCT Application No. PCT/SE2008/051480, Aug. 24, 2009.

(Continued)

*Primary Examiner* — Marceau Milord
(74) *Attorney, Agent, or Firm* — Myers Bigel Sibley & Sajovec, P.A.

(57) ABSTRACT

A method of wireless communication between user equipments includes retrieving user data and a criterion via a software application on a first wireless user equipment having communication interfaces. One of the interfaces is selected based on the criterion. The interface is used to identify wireless user equipments in a proximity of the first user equipment. A total number of user equipments in the proximity of the first user equipment is determined, and, when the number is below a value, another interface is selected. The other interface is used to identify wireless user equipments in the proximity of the first user equipment. A match between the user data of the first user equipment and user data of a second user equipment, causes initiation of wireless communication between the first and the second user equipments by sending to any of the user equipments a message associated with the match.

13 Claims, 4 Drawing Sheets

U.S. PATENT DOCUMENTS

2008/0215689 A1* 9/2008 Pietila ............................ 709/206

FOREIGN PATENT DOCUMENTS

| WO | WO 2004/043026 | A2 | 5/2004 |
| --- | --- | --- | --- |
| WO | WO 2004/043026 | A3 | 5/2004 |
| WO | WO 2008/132241 | A2 | 11/2008 |
| WO | WO 2008/132241 | A3 | 11/2008 |

OTHER PUBLICATIONS

Written Opinion of the International Searching Authority, PCT Application No. PCT/SE2008/051480, Aug. 24, 2009.

International Preliminary Report on Patentability, PCT Application No. PCT/SE2008/051480, Dec. 15, 2010.

* cited by examiner

METHOD AND SYSTEM FOR PROVIDING WIRELESS COMMUNICATION BETWEEN USER EQUIPMENTS

CROSS REFERENCE TO RELATED APPLICATION

This application is a 35 U.S.C. §371 national stage application of PCT International Application No. PCT/SE2008/051480, filed on 17 Dec. 2008, the disclosure and content of which is incorporated by reference herein in its entirety. The above-referenced PCT International Application was published in the English language as International Publication No. WO 2010/071510 A1 on 24 Jun. 2010.

TECHNICAL FIELD

The invention relates to a method, a system, a user equipment and a computer readable medium for determining if there is a match between user data of two user equipments and for providing wireless communication between the two user equipments.

BACKGROUND ART

Today a number of techniques exist for facilitating more spontaneous communication between users of mobile devices (user equipments) like cellular telephones, Personal Digital Assistants (PDA's), smart-phones, laptops etc. who are within each other's immediate physical proximity.

Such techniques typically include an application for allowing users to create profiles for themselves and the people they would like to meet. A user is then connected to proximate mobile users who fit their desired profile, and once a user with like interests is identified further mobile communication is facilitated.

One viable product on the market is SmallPlanet's Crowd-Surfer which is a location-based, mobile social software using Bluetooth technology/IEEE 802.15 standard for the communication between the mobile devices. This solution enables people with the same profile and common friends to meet each other, as each time a potential new contact is within 10 meters, users get a Bluetooth radio signal and relationship information is available via GPRS (General Packet Radio Services) connections to a web site.

Another example is the product Nokia Sensor which enables users to send free messages via Bluetooth to other Nokia Sensor users within the rage of the Bluetooth communication means. In this solution the application software allows users to create a kind of mobile home page, which can include a photo and personal info, and when the user selects a scan command in the application, the user will be able to access mobile home pages within the range of the Bluetooth communication means. After this the user can then decide whom to chat with.

US-2007/0037574-A1 discloses a method and apparatus for a location-based network service and notification system in which registered users are notified of mutual social interest. Here, users subscribed in a community may register in a network location; either by selecting from a stored catalog of locations a fixed network that corresponds to their physical location, or by the spontaneous creation of an ad-hoc network based upon users who are all in the same location. After this the presence of all other users registered in the network location is presented to the user, and the user is allowed to select other of the registered users. Once such selection is accomplished, the user is notified if the selection is mutual.

Further background art is reflected by WO 2004/043026 A2,EP 1942455 A1, US 2006/0025169 A1, WO 03/090143 A2, WO 2008/132241 A2 and US 2005/0181763 A1.

A common purpose of the techniques described above is to facilitate communication between mobile users who do not know each other but share common interests. Such interests may include professional occupation and expertise information, place of living, schools and organizations previously attended to, hobbies, dating preferences, interest in a certain product or activity etc.

However, since Bluetooth technology is used for identifying whether a mobile terminal is within reach of another terminal, existing solutions are greatly limited to a close physical proximity which corresponds to the range of the Bluetooth interface (approximately 10 meters).

Moreover, existing solutions are early examples of a of technology that are designed to create interaction between users, but whenever a user employ the technology there is rarely another user out there to interact with. This in turn means that existing users often give up trying to find some other user which after some time results in the use of the technology slowly diminishing and finally dying out. The limited range also means that it is rather unlikely that a user finds another user to interact with.

Another problem related to the issue of too few users is the fact that people with similar profiles will not meet if they do not use the same software application, since different applications are not compatible.

SUMMARY

In view of the foregoing, it is an object of the invention to provide an improvement of the above techniques and prior art. More particularly, it is an object to provide for communication between users based on matching their user data while at the same time providing a more generic communication framework that is more easily implemented.

Hence a method of providing wireless communication between user equipments is described. The method comprises the steps of: retrieving user data and a predefined communication criterion via a software application residing on a first wireless user equipment having at least two communication interfaces; selecting one of the communication interfaces in dependence of the predefined communication criterion; identifying, by using the selected communication interface, wireless user equipments in a proximity of the first user equipment; determining if there is a match between the user data of the first user equipment and user data of a second user equipment of the identified user equipments; and initiating, if a match is determined, wireless communication between the first and the second user equipment, by sending to any of the user equipments a message associated with the match.

The invention is advantageous in that communication between user equipments is not tied to a specific communication technology but is instead based on an architecture that takes several communication techniques into account. This in turn allows for a more versatile implementation of different software applications that connects users based on common interests. Moreover, the specified combination of steps results in a quite efficient way of providing communication, i.e. setting up and facilitating communication between users of two wireless user equipments, and facilities implementation of specific software applications that send user data to other mobile devices.

Here, the user data is typically information about a user's interests, occupation or any other personal information about the user that can be used for matching against user data of another person. The predefined communication criterion is a setting defining which interface(s) of the communication interfaces shall be used for the communication, such as a Bluetooth interface/IEEE 802.15 WPAN (Wireless Personal Area Network), LAN (Local Area Network) interface, 3G interface or any other interface suitable for wireless communication. The communication criterion typically depends on e.g. the software application, on what type of service the application provides and/or what communication preference the user has selected, such as a communication range to other users.

The identification of user equipments is of course dependant on what type of communication interface is used, but is per se performed according to methods known within the art for the used communication interface.

Typically, the mentioned proximity of a user equipment is defined by the range of the communication interface that is currently selected for the user equipment, which means that the proximity may change as communication interface is changed. Of course, the proximity may also be defined by a distance value set by a user, in which case a communication interface having a communicating range corresponding to the proximity conditions may be selected.

A match between user data occurs when both users have indicated, for example, like interests, like business areas they are active within, same interest in a product and service and so on.

The message associated with the match is typically a message that contains information about another user for which a match was determined, but may only include information about the user equipment belonging to the person for which the match was determined.

It should be observed that denoting the user equipments as "first" and a "second" user equipment only serves the purpose of distinguishing the user equipments; the "second" user equipment may just as well be a "third" or "another" user equipment.

The predefined communication criterion may comprise a distance value which allows for a user or another party to at least indirectly define what communication interface shall be used (and as a consequence how many potential other user that may be contacted as different communication interfaces usually have different ranges). More particularly, the proximity of the first user equipment may be defined by the distance value. In this case user equipments are in the proximity of the first user equipment if their distance from the first user equipment is smaller or equal than the distance value.

The selecting of one of the communication interfaces may comprise selecting the interface in dependence of a type of the software application residing on the first user equipment, which provides for e.g. a more versatile third party implementation of software applications that facilitates connection of users with common interests. Here, some different types of software applications include e.g. social networking applications, advertisement applications, dating applications, gaming applications etc. In brief, selecting the interface "in dependence of a type of software application" means that the application has a setting that defines which communication interface(s) shall be selected and, optionally, in which order the interfaces shall be selected in case several different interfaces may be selected.

The initiating of the wireless communication may be performed if the predefined communication criterion of the first user equipment is fulfilled, and/or if a predefined communication criterion of the second user equipment is fulfilled, which increases a user's possibility to define his own privacy setting and ensures more reliable identification of common interests.

The method comprises the step of determining a total number of identified user equipments in the proximity of the first user equipment, and, if the number is below a predetermined value: selecting another communication interface of the two communication interfaces; and identifying, by using said another communication interface, wireless user equipments in the proximity of the first user equipment. This is advantageous in that e.g. an interface with a shorter range may be used for identifying users with common interests when none or to few user equipments are in the proximity of the first user equipment, before a communication interface with a larger range (which may be more expensive and energy consuming) is used.

The method may comprise the step of storing, in the second wireless user equipment, user equipment identification data pertaining to the first user equipment. This reduces effort required by the user equipment identification process in case the second user equipment seeks to identify user equipments in its proximity.

The communication interface may comprise a server for wireless communication, which allows for a greater range between the user equipments as communication may be done via the server. Here, the server for wireless communication is an active electronic device that is attached to a communications network, and is capable of sending, receiving and/or forwarding information over a wireless communications channel. Typically the server is comprised in a mobile operator's backend server for wireless communication. However, the server may also be a radio receiver/transmitter that serves as the hub of a local wireless network, and may also be a gateway between a wired network and a wireless network.

The method may comprise the step of sending, from the first user equipment to the server, information pertaining to a location of the first user equipment, which allows for determining which user equipments in the proximity of the first user equipment shall be contacted. In a corresponding manner the method may comprise the step of sending, from the second user equipment to the server, information pertaining to a location of the second user equipment, which allows for determining a distance between the first and the second user equipment.

The method may comprise the step of collecting, by the server, information pertaining to a location of a respective wireless user equipment of a plurality of wireless user equipments. This provides for returning user equipment distance values to the first user equipment which is beneficial in terms of providing suitable criterion for selecting a most beneficial communication interface.

The first user first equipment may comprise: an application abstraction layer for the software application; a communication abstraction layer for the communication interfaces; and an intermediate abstraction layer arranged between the application abstraction layer and the communication layer. This is advantageous in that an interface structure is provided which facilities for implementing different types of person matching software applications, such that the applications may interact and be used for determining a match between two sets of personal data and subsequently be used for the initialization of wireless communication between the user equipments.

According another aspect of the invention, a system for providing wireless communication between user equipments is described. The system is configured to: retrieve user data and a predefined communication criterion via a software application residing on a first wireless user equipment having at least two communication interfaces; select one of the communication interfaces in dependence of the predefined communication criterion; identify, by using the selected communication interface, wireless user equipments in a proximity of the first user equipment; determine if there is a match between the user data of the first user equipment and user data of a second user equipment of the identified user equipments; and initiate, if a match is determined, wireless communication between the first and the second user equipment, by sending to any of the user equipments a message associated with the match.

The system may include the following mutually independent features: the predefined communication criterion may comprise a distance value; the proximity of the first user equipment may be defined by the distance value; the select of one of the communication interfaces may comprise select of the interface in dependence of a type of the software application residing on the first user equipment; the initiate of the wireless communication may be performed if the predefined communication criterion of the first user equipment is fulfilled; and the initiate of the wireless communication may be performed if a predefined communication criterion of the second user equipment is fulfilled.

The system is configured to determine a total number of identified user equipments in the proximity of the first user equipment, and, if the number is below a predetermined value: select another communication interface of the two communication interfaces, and identify, by using said another communication interface, wireless user equipments in the proximity of the first user equipment.

The system may also be configured to store, in the second wireless user equipment, user equipment identification data pertaining to the first user equipment.

The communication interface may comprise a server for wireless communication, and the system may be configured to send, from the first user equipment to the server, information pertaining to a location of the first user equipment.

The system may also be configured to collect, by the server, information pertaining to a location of a respective wireless user equipment of a plurality of wireless user equipments.

According to yet another aspect of the invention a user equipment for wireless communication is configured to: retrieve user data and a predefined communication criterion via a software application residing on the user equipment which comprises at least two communication interfaces; select one of the communication interfaces in dependence of the predefined communication criterion; initiate, by using the selected communication interface, identification of wireless user equipments in a proximity of the user equipment; determine a total number of identified user equipments in the proximity, and, if the number is below a predetermined value, select another communication interface of the two communication interfaces and identify, by using said another communication interface, wireless user equipments in the proximity; receive, if there is a match between the user data of the user equipment and user data of a responding user equipment of the identified user equipments, a reply from the responding user equipment; and send to the responding user equipment, if the reply is received, a message associated with the match.

According to the invention, a computer readable medium is also provided, having stored thereon a computer program having software instructions which when run on the computer cause the computer to perform the steps of: retrieving user data and a predefined communication criterion via a software application residing on a first user equipment which comprises at least two communication interfaces; selecting one of the communication interfaces in dependence of the predefined communication criterion; initiating, by using the selected communication interface, identification of wireless user equipments in a proximity of the first user equipment; determining a total number of identified user equipments in the proximity of the first user equipment, and, if the number is below a predetermined value, selecting another communication interface of the two communication interfaces and identifying, by using said another communication interface, wireless user equipments in the proximity of the first user equipment; receiving, if there is a match between the user data of the user equipment and user data of a responding user equipment of the identified user equipments, a reply from the responding user equipment; and sending, if the reply is received, to the responding user equipment a message associated with the match.

Here a computer is any electronic device with a processor unit that is capable of executing software instructions, which includes personal computers, mobile phones, PDAs, media players etc.

The inventive system, user equipment and computer readable medium may comprise, be configured to execute and/or perform any of the features described above in association with the inventive method, and has the corresponding advantages.

BRIEF DESCRIPTION OF THE DRAWINGS

Embodiments of the invention will now be described, by way of example, with reference to the accompanying schematic drawings, in which.

DETAILED DESCRIPTION OF PREFERRED EMBODIMENTS

In brief, an embodiment of the invention describes an arrangement of a database with social and/or commercial data, and different communication equipments that are able to facilitate person to person or apparatus to person communication based on the data. The communication is based on an announce model where a user is able to both announce social networking data to others as well as respond to announcements from other users. The objective of the announcement is to find persons or apparatuses that shares common interests with the announcer, i.e. a match between user data is performed. To facilitate this, user equipments implement an enhanced personal communication (EPC) functionality which reside in the user equipments. Optionally, the user equipments also use a communication server for implementing the EPC functionality. Included in the functionality is also a user proximity match which identifies other users that are within the proximity of a certain user equipment. An announcement occurs when a user equipment is switched on, when an area of coverage changes for a used communication interface or when the announcement is explicitly requested by a user.

Figure 1:
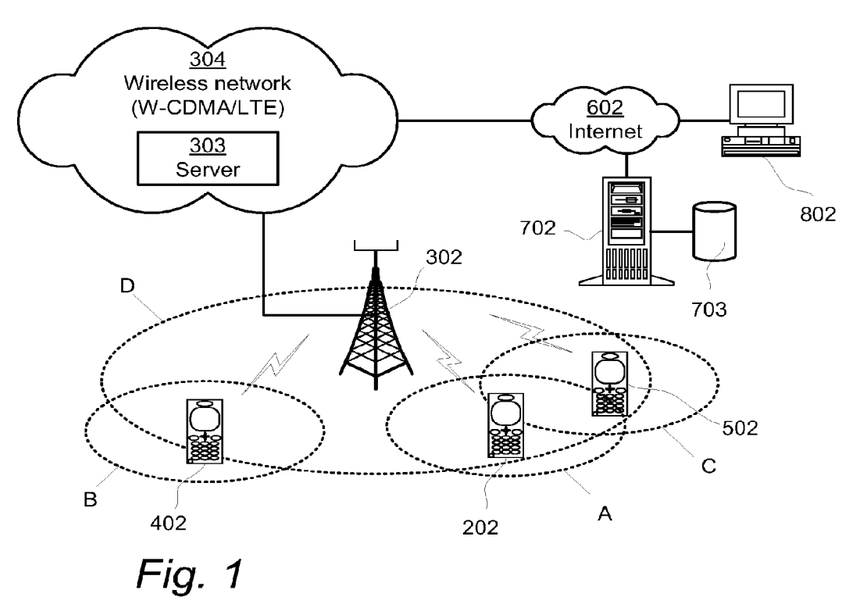
FIG. 1 illustrates communicating user equipments that implement the invention.

With reference to FIG. 1 a system implementing the invention is illustrated, where a first 202, a second 402 and a third 502 user equipment are located within the range of a base station 302 which is a part of a wireless communication network 304 that incorporates a mobile operator's backend (communication) server 303. The communication server 303 is configured to use the base station 302 to wirelessly communicate with the user equipments 202, 402, 502 such that users of the user equipments 202, 402, 502 may exchange information.

The wireless communication network 304 is a wireless network such as, for example, a GPRS or a W-CDMA cellular network, or an LTE (Long Term Evolution) cellular network implemented accordance with the 3GPP (Third Generation Partnership Project) Release 8 specifications. The mentioned server 303 included in the network 304 acts as a communication bride between the user equipments 202, 402, 502.

The communication network may also be a local wireless network such as a IEEE 802.11 network which includes Wi-Fi or WLAN networks. In this case the base station and server form a radio receiver/transmitter that serves as the hub of a local area network. The combination of server and base station may also be a gateway between a wired network and the wireless network, in which case the server typically would comprise a low-power transmitter and a wireless router. This includes the possibility to use a residential gateway or to use a femtocell as the server and the base station. From this it follows that the communication server and the base station may, in dependence of the type of wireless communication network used, be treated as one unit or as separate units performing different but cooperating functions.

The user equipments 202, 402, 502 are typically mobile phones, PDA's, personal computers, media players etc. or any other device capable of allowing a user of the equipment to communicate wirelessly with another user of a user equipment. Each user equipment 202, 402, 502 has at least two communication interfaces, as will be elucidated below, of which one interface typically has a longer reach than the other. Here the reach is the same as a maximum communication distance a user equipment may be located from another user equipment that also includes the EPC functionality. To extend their reach the user equipments 202, 402, 502 may use the server 303 in combination with the base station 302 in a manner known within the art.

Each user equipment 202, 402, 502 has an area of coverage A, B, C that extends a distance from the respective user device 202, 402, 502, which area is defined by the range of a short range communication interface (not using a base station or communication server) of the respective user equipment 202, 402, 502. If two user equipments 202 and 502 have overlapping areas of coverage A, C they are able to independently establish communication, i.e. without using the base station 302 and server 303.

The base station 302 also has an area of coverage D where user equipments 202, 402, 502 within the area D are capable of communicating with the server 303 via the base station 302 for purpose of setting up a communication link to other user equipments. In this case the user equipments 202, 402, 502 use a long range communication interface (using a base station and communication server). The server 303 is capable of communicating, via a network 602 such as the Internet, with an application server 702 that in turn is connected to a database 703. A personal computer 802 is also connected to the network 602 for facilitating communication with the application server 702.

The application server 702 includes a social or commercial networking service and a user of the service may via one of the user equipments 202, 402, 502, or via a computer, like the personal computer 802, upload personal and commercial information in the database 703. Social and commercial networking services are today common and include, for example, services like MySpace, Facebook, LinkedIN and Ebay. Personal information may include social interests, information about a profession, interest in products (to buy or sell), dating information etc. and are intended to reflect a persons values and interests. The personal information is usually stored in the database 703 but might just as well be stored, either in part or in full, in one of the user equipments 202, 402, 502. In any case, the personal information form so called user data that might, in case the user data is not already present in the user equipment, be downloaded to the user equipment and be used and structured as later described.

Figure 2:
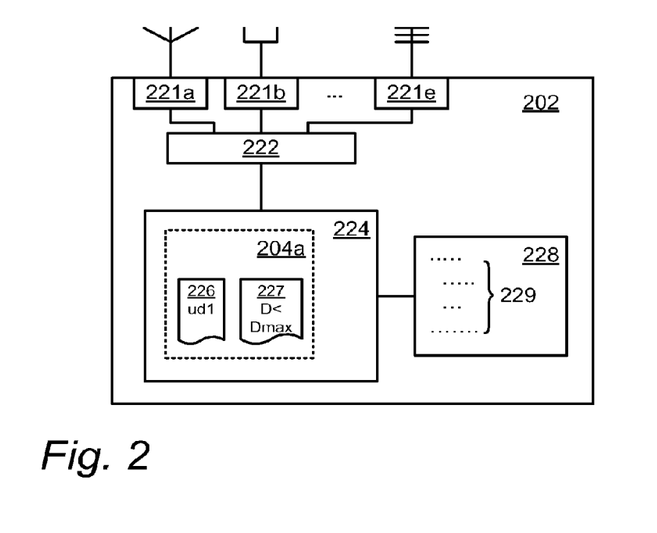
FIG. 2 illustrates in more detail one of the user equipments of FIG. 1.

With reference to FIG. 2 a user equipment 202 is illustrated in more detail and comprises a central processing unit 224 that is connected to and capable of controlling a communication interface selector 222. The interface selector 222 is in turn arranged to control several communication interface units 221a-221e such as a Bluetooth, ZigBee, 2G, 3G, LTE, WiFi/IEEE 802.11x or WiMAX/IEEE 802.16 unit or any other interface unit that is suitable for wireless communication with other user equipments. At least a first interface unit of the interface units 221a-221e can communicate directly with a corresponding communication interface unit of another user equipment, while at least a second interface unit of the interface units 221a-221e can communicate via a base station/communication server with a corresponding communication interface of another user equipment.

A memory unit 228 is connected to the processor unit 224 and software instructions 229 for one or more software applications stored on the memory unit 228. Here one of these software applications is an application 204a that implements EPC functionality and resides on the central processing unit 224 when executed. The software application 204a comprises, or may from the memory unit 228 retrieve, user data 226 (ud1) that comprises personal information about a user of the user equipment 202 as well as retrieve a predefined communication criterion 227 that indicates which of the communication interface 221a-221e shall be used.

The predefined criterion may e.g. be a value that explicitly defines which communication interface shall be used, or it may be a set of rules that use the interfaces to detect other user equipment or local area networks and then selects the most suitable communication interface. In the latter case, the rules may define that a short range interface such as Bluetooth shall be used before a long range interface like 3G and LTE. For example, if the EPC implementing application 204a needs a long range, e.g. if it should search for persons with common interests in the area of Stockholm, Sweden, the default criterion for that application would be to use a communication interface like 3G or LTE.

Moreover, the rules may define a minimum number of other user equipments the must be identified, and that another communication interface shall be used if this number is not reached. Of course, it is possible to use several communication interfaces at the same time, such that communication with one user equipment is set up via a short range interface while communication with another user equipment is set up via a long range interface, for e.g. ensuring proper communication with a desirable number of proximate other users.

The three user equipments 202, 402, 502 mentioned in connection with FIG. 1 are all similar.

Figure 3:
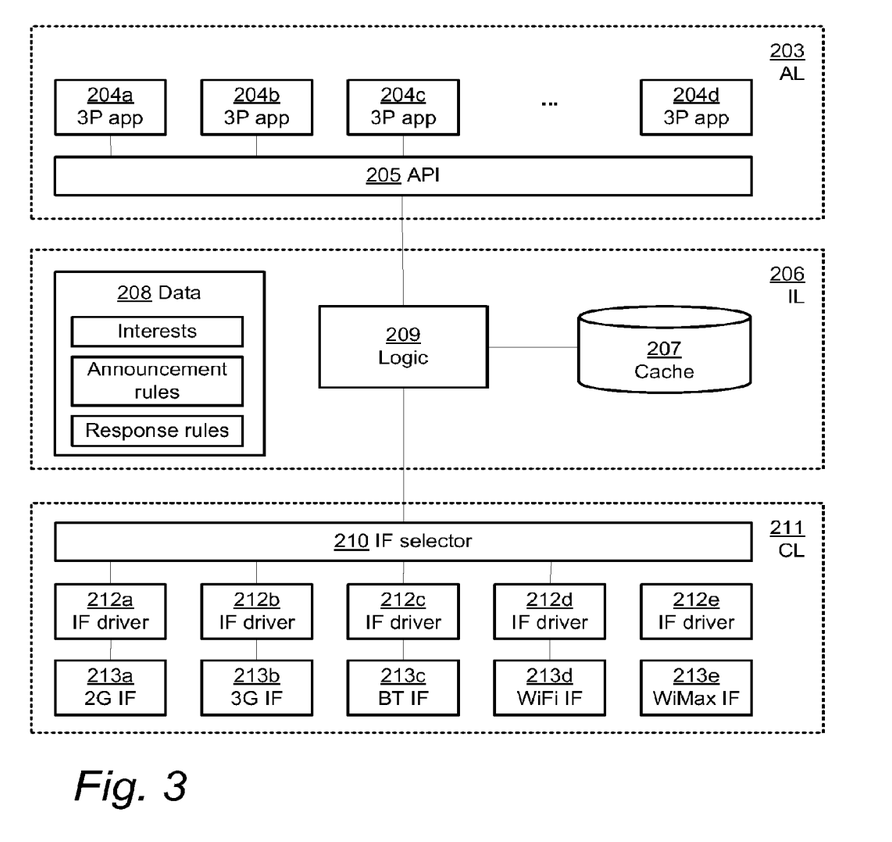
FIG. 3 illustrates an application abstraction layer of the user equipment of FIG. 2.

With further reference to FIG. 3, three application abstraction layers of the user equipment 202 are illustrated. In this context, an application abstraction layer (or abstraction level)

is a way of hiding the implementation details of a particular set of functions of the EPC functionality. From this it follows that each level presents an abstract interface that allows a software programmer to read and write instructions from or to the layer. The layer then performs an actual transformation of data needed to perform the various steps and functions of the layer.

The first, uppermost layer is an application layer 203 (AL) that comprises a number of 3:rd party EPC software applications 204a-204d (3P app) that could be developed by different vendors and which, either each independently or in combination, form the user interface of and implements the specific user functions of the EPC functionality. All 3:rd party EPC software applications 204a-204d use an application programming interface 205 (API) comprised in the application layer 203 for communicating with an intermediate layer 206 (IL). This application programming interface 205 is, as common within the art, a set of functions, procedures, methods and classes that the underlying layers provide to support requests made by the 3:rd party EPC software applications 204a-204d.

The intermediate layer 206 below the application layer 203 has a number of units, i.e. a cache unit 207, a logic unit 209 and a data unit 208.

The cache unit 207 is used to store broadcasted pieces of data, or so called announcements, sent from other user equipments. The purpose of the cache unit 207 is to limit the periodicity of broadcasts required to maintain a meaningful interaction between user equipments. Also the cache unit 207 reduces the amounts of announces sent from the user equipment 202, since the user equipment 202 is able to first search in the cash unit 207 (and occasionally find) information about other users which thereby may reduce the number of necessary announcements.

The logic unit 209 of the intermediate layer 206 acts as a bridge between the application layer 203 (more specifically the application programming interface 205), the cache unit 207, the data unit 208 and a communication layer 211 (CL) residing below the intermediate layer 206. The logic unit 209 performs an analysis of rules contained in the data of the intermediate layer 206 and creates announcements requests based on input from the application layer 203 as well as determines, based on a set of response rules, how an incoming announcement of another user equipment shall be handled.

The data unit 208 of the intermediate layer 206 comprises user data describing a user of the user equipment 202, and include a description of social networking data and statements indicating interests of the user. The data unit 208 also comprises announcement rules for creating an announcement as well as response rules for determining if a received announcement shall be responded to. The rules include how user data shall be made available in an announcement or response, and indicate conditions of how the user data should be made available to other announcing or responding users. The data unit 208 of the intermediate layer 206 is accessible from the application programming interface 205 via the logic unit 209.

The data and rules in the data unit 208 are uploaded via the 3:rd party EPC software applications 204a-204d, for example when the 3:rd party EPC software application is initialized. As mentioned, the data and the rules may be downloaded to the user equipment 202, e.g. from the application server 702.

The afore mentioned communication layer 211 resides below the intermediate layer 206 and comprises of an interface selector 210 (IF selector) connected to wireless communication interfaces 213a-213e of the user equipment 202. The purpose of the interface selector 210 is to set which of the several available communication interfaces 213a-213e an announcement message should be sent over. The decision is made based on the available interfaces and on the range specified by the EPC functionality of the 3:rd party EPC application being executed. The communication layer 211 has access to the communication interfaces 213a-213e via interface drivers 212a-212e, and depending on the choice made by the executed 3:rd party EPC application, a proper interface is selected in accordance with on the needs of the 3:rd party EPC application, the number of proximate user equipments etc. as further described below. Each communication interface 213a-213e resides on a respective of the communication interface units 221a-221e described in connection with FIG. 2.

The data in the data unit 208 has a structure, or model, that supports user data, the creation of the announcements and the responses to announcements. Accordingly, the data model has a collection of user data sets as well as announcement rules and response rules. Typically, a user or a service operator sets the user data and the rules via a one of the 3:rd party EPC applications 204a-204b which then transmits the data and rules via the application programming interface 205 and the logic unit 209 to the data unit 208.

The user data comprises categories which are placeholders for unique sets of data where there could be several elements in a set. Examples of categories may be e.g. hobbies, product interests, employments etc. The set of data in for example the "hobbies" category may include e.g. soccer, and elements in the "soccer" set may be favorite team, years played, my best score and so on.

Announcement rules define what portions of the user data may be announced to other user equipments, and may include an "always rule" that allows each of the categories, sets and elements to be announced, i.e. sent to other user equipments. Conditional rules may also be implemented where filters discriminate what data can be announced, as well as a rule preventing any data to be used when announcing.

Response rules define in a corresponding manner what portions of the user data may be shared or sent to other user equipments when an announcement is received. Here an "always rule" may be used that allows each of the categories, sets and elements to be included in a response to the announcement, but for privacy concerns conditional rules are implemented for discriminating what data can be included in the response. Such rules include a blocking rule preventing any data other than user equipment identifying data to be sent.

Of course, as known within the art, user data, announcement rules and response rules may be structured in many other ways, and it is possible to implement filters that match a user's list of other persons he is willing to communicate with as well as a list with persons that are denied communication when they send an announcement.

Figure 4:
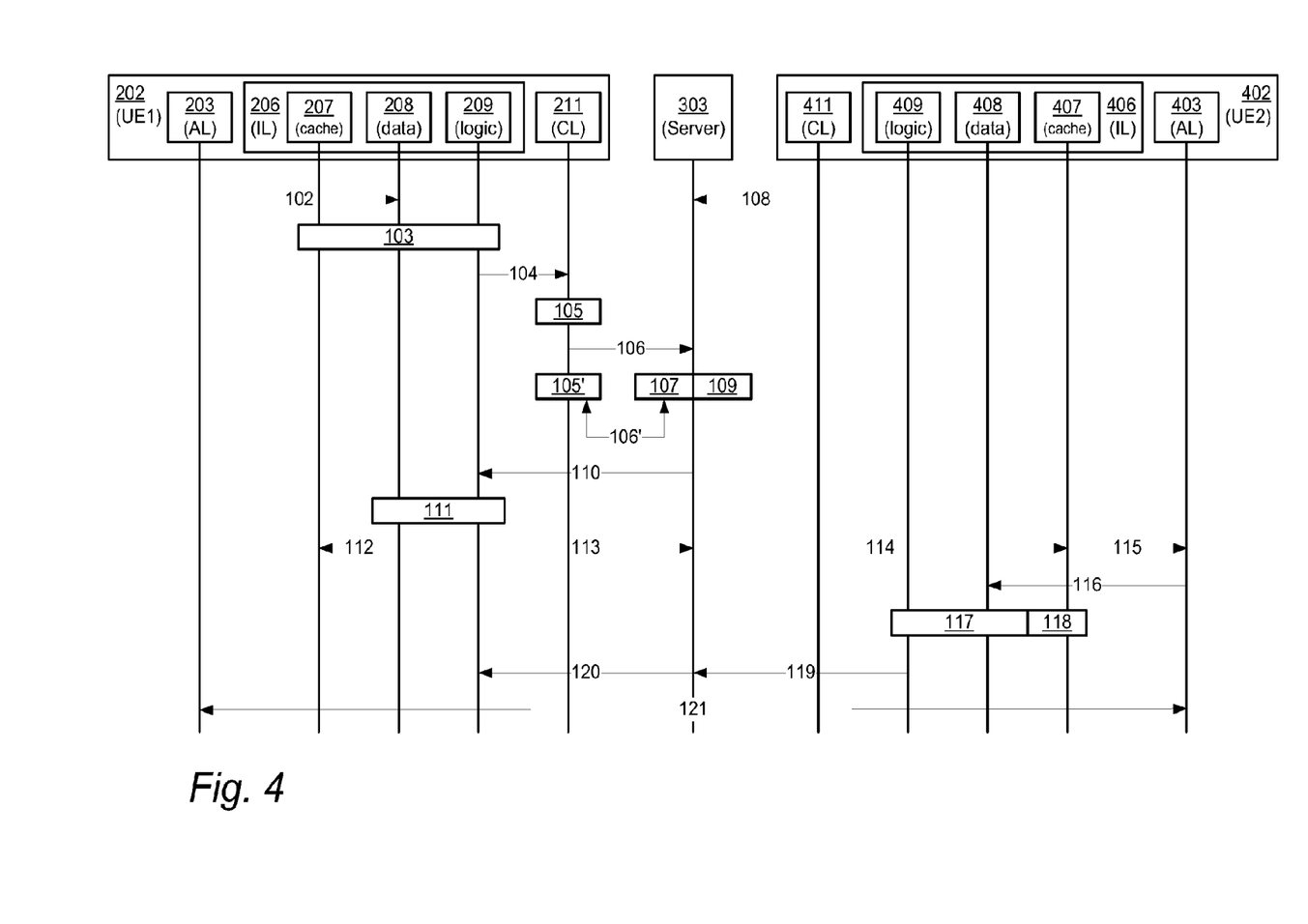
FIG. 4 is a process diagram of an embodiment of the invention using a server for the communication between two user equipments.

With reference to FIG. 4, the operation of the EPC functionality is illustrated, where the first user equipment 202 (UE1) communicates via the base station 302 and server 303 with the second user equipment 402 (UE2). This case occurs for example when the user equipment 202 is not able to independently perform a detection of proximate user equipments, or when other user equipments are out of range of a short range communication interface of the first user equipment 202.

Here the application layer 203 of the first user equipment 202 sends 102, by using a 3:rd party EPC software application residing on the first wireless user equipment 202, the user data 226 and the predefined communication criterion 227 to the intermediate layer 206. The data 226 and criterion 227 are stored in the data unit 208. In this context "sending" something from a device may be functionally replaced by "retrieving" the same thing from the same device, and here the term should be treated as equivalents.

Next the data and criterion are analyzed 103 by the logic unit 209 that has received, or retrieved, the user data and the predefined communication criterion from the application layer 203. This analysis includes using data in the data unit 208 as well as using any data in the cache unit 207, for example in case the cache unit 207 holds information about a user that previously sent an announcement to the first user equipment 202. The rules typically include information like the position of the first user equipment 202 and a greatest acceptable distance to other user equipments. The position is determined by methods known within the art and may use any one or a mixture of GPS devices of the user equipment and triangulation technologies and network cell identity technologies in, for example, 3G systems.

Thereafter 104 the rules are forwarded to the communication layer 211 which selects a communication interface in accordance with the rules and/or the communication criterion. For example, if the user had set that he only wants to contact other persons that are within a range of maximum 10 meters, the communication criterion may indicate that the interface is a Bluetooth interface. On the other hand, if the user wants a larger area over coverage the communication criterion may indicate that, for example, a 3G communication interface shall be used.

Communication interface is set 105 by the communication layer 211 in accordance with the communication criterion and then sends 106 to the server 303 information about the location of the first user equipment 202 and a maximum desired distance to other user equipments.

Continuously other user equipments such as the second user equipment 402 reports 108 to the server 303 via the base station 302 its position and its maximum desired distance to other user equipments.

This means that the server 303 indentifies 107, monitors and determines 109 a total number user equipments within its area of coverage. In case an insufficient number of user equipments are found or if no user equipments are found at all, the server 303 reports 106' back to the first user equipment 202 which then may select 105' another communication interface that has a greater range than the first selected communication interface, or just select another range for the first selected communication interface. When this is done it is forwarded 106' to the server 303 which identifies other user equipments within this new range. Once this is done a proximity list of other user equipments is sent 110 via the communication layer 211 to the intermediate layer 206 of the first user equipment 202. If another communication interface was previously selected the communication may be performed over another type of communication server, and other interfaces may be selected in an iterative manner until a user equipment within a desired proximity is found.

The identified user equipments are stored 112 in the cache unit 207 of the first user equipment 202 and an announcement (invitation to communicate) is created 111 and sent 113, 114, 115 to the second user equipment 402 which is similar with the first user equipment 202 and accordingly has a corresponding application layer 402, intermediate layer 406, communication layer 411, logic unit 409, data unit 408 and cache unit 407. The invitation comprises information about a user of the first user equipment 202 and the communication rules that applies for this user. The application layer 403 of the second user equipment 402 sends 116 information about a user of the second user equipment 402 which information is processed to determine 117 if here is a match between the user data of the first user and the user data of the second user.

As with the first user equipment 202, information about the first user and his user equipment 202 is stored 118 in the cache unit 407 of the second user equipment 402.

If there was a match between the user data information of the first 202 the second 402 user equipment the second user equipment 402 sends 119 to the server 303 which then forwards 120 to the first user equipment 202 a response message that indicates willingness to communicate. Finally, when the response indicating communication willingness was received, communication between the user equipments 202, 402 is initiated 121, which may include a video, phone call or short message service being set up. This set up process may also include displaying data information of the other user. Of course, the step of setting up communication between two user equipments using the same type of communication interface depends on the interface per se, and is done according to methods known for the respective communication interface.

Figure 5:
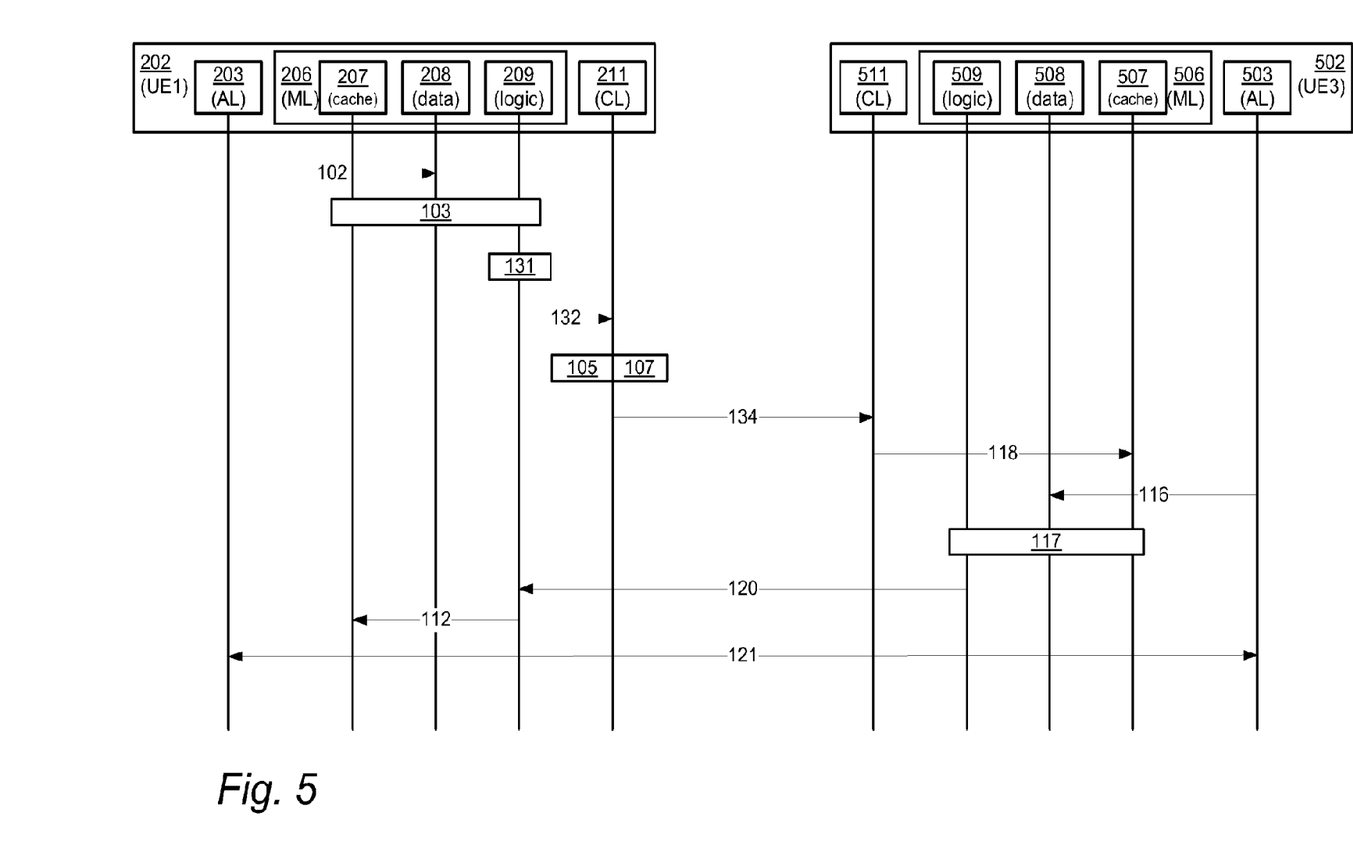
FIG. 5 is a process diagram of another embodiment of the invention using direct communication between two user equipments.

With reference to FIG. 5, the operation of the enhanced personal communication functionality is illustrated where the first user equipment 202 communicates directly with the third user equipment 502 (UE3) which is similar with and in a close proximity of the first user equipment 202. This case is typical when the communication interface comprises for example Bluetooth, ZigBee or WLAN technology that do not need a communication server and base station.

In this case the intermediate layer 206 retrieves 102 user data and communication criteria from the application layer 203 and creates 103 communication rules just like in the case of user equipments 202, 402 communicating via a server. However, in this of case of not using a server the intermediate layer 206 in the user equipment 202 creates 131 an announcement that is forwarded 132 to the communication layer 211. The announcement comprises identification information for the user equipment 202 as well as the user data that indicate a users interests. Exactly what type of information and in particular user data that is included in the announcement depends as earlier described on the software application in the application layer 203, since various types of information is desired in different applications. The communication layer 211 selects 105 a communication interface which in this case as mentioned is an interface that does not require any server for communicating with other user equipments.

The communication layer 211 is used for identifying 107 user equipments within the range of the selected communication interface and creates a list if of these user equipments. Here the third user equipment 502 is within the range of the communication interface of the first user equipment 202 and receives the announcement sent 134 by the first user equipment 202.

The third user equipment 502 stores 118 information that was contained in the announcement, which typically includes storing the mentioned identification information of the first user equipment 202 as well as user data belonging to the user of the first user equipment 202. From the application layer 503 of the third user equipment 502 user data and response rules (communication criterion) of its user is sent 116 to the intermediate layer 506 where a match is determined 117 to see if the users of the user equipments 202, 502 have common interests.

If a match is determined the third user equipment 502 sends 120 a response message that indicates willingness to communicate. This response comprises identification information for the third user equipment 502 as well as personal data of the user of the third user equipment 502. The first user equipment 202 also stores 112 information included in the response.

When the response is received communication between the user equipments 202, 502 is initiated 121, which as mentioned before may include a video, phone call or short message service being set up. Again, the step of setting up communication between two user equipments depends on the interface technology and is done according to methods known for the interface.

The communication illustrated by FIG. 5 may also include determining of how many user equipments are found by the first user equipment, and, in case none or to few user equipments are found, may comprise selecting another communication interface with a longer range such as a communication interface using a base station and communication server for extending the reach. The reselection of communication interface may be done in a manner that corresponds to the communication described in connection with FIG. 4.

The steps for the cases above must not be performed in the specifically described sequences. For example, user data may be sent form an application layer to the intermediate layer as soon as the 3:rd party EPC software application is up and running. The steps may also include other measures to be taken, such as the determining of the match may be followed by displaying a message to a user of any of the equipments who then actively may accept or reject an invitation to communicate. Such a displayed message may include information about the user that may be accepted or rejected.

Of course, the various communication interfaces described herein are implemented according known standards and protocols. In fact, the invention may be implemented on present, advanced mobile communication devices having at least two different communication interfaces, e.g. WiFi and 3G-equipped mobile phones, Bluetooth and 3G-equipped mobile phones, WiFi, 3G and Bluetooth equipped mobile phones, and Bluetooth and WiMax-equipped mobile phones, without needing any hardware adaptation of the mobile communication device.

The same applies for the wireless network, i.e. the invention may be implemented by using present mobile communication systems like GPRS, W-CDMA or 3GPP Rel 8 LTE systems, without needing any hardware adaptation of the used mobile communication system.

Although various embodiments of the invention have been described and shown, the invention is not restricted thereto, but may also be embodied in other ways within the scope of the subject-matter defined in the following claims. In particular, the invention may be implemented by using other communication interfaces than the ones mentioned herein.

The invention claimed is:

1. A method of providing wireless communication between user equipments, the method comprising the steps of:
    retrieving user data and a predefined communication criterion via a software application residing on a first wireless user equipment having at least two communication interfaces,
    selecting one of the communication interfaces in dependence of the predefined communication criterion,
    identifying, by using the selected communication interface, wireless user equipments in a proximity of the first user equipment,
    determining a total number of identified user equipments in the proximity of the first user equipment, and, when the number is below a predetermined value, selecting another communication interface of the two communication interfaces and identifying, by using said another communication interface, wireless user equipments in the proximity of the first user equipment,
    determining when there is a match between the user data of the first user equipment and user data of a second user equipment of the identified user equipments, and
    initiating, when a match is determined, wireless communication between the first and the second user equipment, by sending to any of the user equipments a message associated with the match.

2. A method according to claim 1, wherein the predefined communication criterion comprises a distance value.

3. A method according to claim, wherein the selecting of one of the communication interfaces comprises selecting the interface in dependence of a type of the software application residing on the first user equipment.

4. A method according to claim 1, wherein the initiating of the wireless communication is performed when the predefined communication criterion of the first user equipment is fulfilled.

5. A method according to claim 1, wherein the initiating of the wireless communication is performed when a predefined communication criterion of the second user equipment is fulfilled.

6. A method according to claim 1, further comprising the step of storing, in the second wireless user equipment, user equipment identification data pertaining to the first user equipment.

7. A method according to claim 1, wherein the communication interface comprises a server for wireless communication.

8. A method according to claim 7, further comprising the step of sending, from the first user equipment to the server, information pertaining to a location of the first user equipment.

9. A method according to claim 7, further comprising the step of collecting, by the server, information pertaining to a location of a respective wireless user equipment of a plurality of wireless user equipments.

10. A method according to claim 1, wherein the first user equipment comprises
    an application abstraction layer for the software application,
    a communication abstraction layer for the communication interfaces, and
    an intermediate abstraction layer arranged between the application abstraction layer and the communication layer.

11. A system for providing wireless communication between user equipments, the system being configured to:
    retrieve user data and a predefined communication criterion via a software application residing on a first wireless user equipment having at least two communication interfaces,
    select one of the communication interfaces in dependence of the predefined communication criterion,
    identify, by using the selected communication interface, wireless user equipments in a proximity of the first user equipment,
    determine a total number of identified user equipments in the proximity of the first user equipment, and, when the number is below a predetermined value, select another communication interface of the two communication interfaces and identify, by using said another communication interface, wireless user equipments in the proximity of the first user equipment,
    determine when there is a match between the user data of the first user equipment and user data of a second user equipment of the identified user equipments, and
    initiate, when a match is determined, wireless communication between the first and the second user equipment, by sending to any of the user equipments a message associated with the match.

12. A user equipment for wireless communication, configured to:
- retrieve user data and a predefined communication criterion via a software application residing on the user equipment which comprises at least two communication interfaces,
- select one of the communication interfaces in dependence of the predefined communication criterion,
- initiate, by using the selected communication interface, identification of wireless user equipments in a proximity of the user equipment,
- determine a total number of identified user equipments in the proximity, and, when the number is below a predetermined value, select another communication interface of the two communication interfaces and identify, by using said another communication interface, wireless user equipments in the proximity,
- receive, when there is a match between the user data of the user equipment and user data of a responding user equipment of the identified user equipments, a reply from the responding user equipment, and
- send to the responding user equipment, when the reply is received, a message associated with the match.

13. A computer readable medium having stored thereon a computer program having software instructions which when run on the computer cause the computer to perform the steps of:
- retrieving user data and a predefined communication criterion via a software application residing on a first user equipment which comprises at least two communication interfaces,
- selecting one of the communication interfaces in dependence of the predefined communication criterion,
- initiating, by using the selected communication interface, identification of wireless user equipments in a proximity of the first user equipment,
- determining (109) a total number of identified user equipments in the proximity of the first user equipment, and, when the number is below a predetermined value, selecting another communication interface of the two communication interfaces and identifying, by using said another communication interface, wireless user equipments in the proximity of the first user equipment,
- receiving, when there is a match between the user data of the user equipment and user data of a responding user equipment of the identified user equipments, a reply from the responding user equipment, and
- sending, when the reply is received, to the responding user equipment a message associated with the match.

* * * * *

UNITED STATES PATENT AND TRADEMARK OFFICE
CERTIFICATE OF CORRECTION

PATENT NO. : 8,406,691 B2
APPLICATION NO. : 13/133512
DATED : March 26, 2013
INVENTOR(S) : Bogestam et al.

It is certified that error appears in the above-identified patent and that said Letters Patent is hereby corrected as shown below:

In the Specifications

In Column 4, Lines 12-13, delete "or to few" and insert -- or too few --, therefor.

In Column 7, Lines 46-47, delete "device 202, 402, 502," and insert -- equipments 202, 402, 502, --, therefor.

In Column 8, Line 9, delete "persons" and insert -- person's --, therefor.

In Column 13, Line 8, delete "or to few" and insert -- or too few --, therefor.

In the Claims

In Column 16, Line 10, in Claim 13, delete "determining (109)" and insert -- determining --, therefor.

Signed and Sealed this
Fifteenth Day of October, 2013

Teresa Stanek Rea
*Deputy Director of the United States Patent and Trademark Office*